US011865486B2

United States Patent
Fischer et al.

(10) Patent No.: US 11,865,486 B2
(45) Date of Patent: Jan. 9, 2024

(54) MODULAR DUST COLLECTION SYSTEM

(71) Applicant: Engineered Recycling Systems, LLC, Atlanta, GA (US)

(72) Inventors: Andreas Fischer, Ann Arbor, MI (US); Michael P. Carver, Sr., Marietta, GA (US); James P. Cunningham, Marietta, GA (US); Jamie Castro, Marietta, GA (US)

(73) Assignee: Engineered Recycling Systems, LLC, Atlanta, GA (US)

( * ) Notice: Subject to any disclaimer, the term of this patent is extended or adjusted under 35 U.S.C. 154(b) by 380 days.

(21) Appl. No.: 17/374,705

(22) Filed: Jul. 13, 2021

(65) Prior Publication Data

US 2023/0012503 A1 Jan. 19, 2023

(51) Int. Cl.
*B01D 46/26* (2006.01)
*B01D 33/067* (2006.01)
(Continued)

(52) U.S. Cl.
CPC ............. *B01D 46/26* (2013.01); *B01D 25/02* (2013.01); *B01D 33/067* (2013.01);
(Continued)

(58) Field of Classification Search
CPC .... B01D 33/067; B01D 25/02; B01D 46/682; B01D 46/0005; B01D 46/103;
(Continued)

(56) References Cited

U.S. PATENT DOCUMENTS 3,306,457 A 2/1967 Putnam
4,154,588 A * 5/1979 Herndon, Jr. .......... B01D 46/04
55/294

(Continued)

FOREIGN PATENT DOCUMENTS

| DE | 4432004 | 2/1997 |
| DE | 10164080 | 4/2007 |
| WO | 2020/197538 | 10/2020 |

OTHER PUBLICATIONS

Continuous Cleaning Modular (CCM™) Filter Operating and Maintenance Instructions, Engineered Recycling Systems, LLC, dated Feb. 13, 2020.
(Continued)

*Primary Examiner* — Robert Clemente
(74) *Attorney, Agent, or Firm* — ANDRUS INTELLECTUAL PROPERTY LAW, LLP

(57) ABSTRACT

A support frame for dust collection system including a drum filter and a filter cleaning system is disclosed where the frame includes a plurality of octagonal supports spaced apart from each other in an axial direction defining an octagon-shaped peripheral profile. A plurality of axial members extend between adjacent octagonal supports, and end covers are secured to the frame members with each cover including a first inlet opening and a second inlet opening. The support frame may be used in a modular dust collection with a plurality of modular segments of filter media segments secured to the frame and a filter cleaner segments corresponding to the filter media segments.

20 Claims, 14 Drawing Sheets

(51) Int. Cl.
   *B01D 25/02*   (2006.01)
   *B01D 46/00*   (2022.01)
   *B01D 46/10*   (2006.01)
   *B01D 46/682*  (2022.01)

(52) U.S. Cl.
   CPC ..... *B01D 46/0005* (2013.01); *B01D 46/0056* (2013.01); *B01D 46/103* (2013.01); *B01D 46/682* (2022.01); *B01D 2201/282* (2013.01); *B01D 2201/4023* (2013.01); *B01D 2271/02* (2013.01); *B01D 2321/26* (2013.01)

(58) Field of Classification Search
   CPC ...... B01D 2201/282; B01D 2201/4023; B01D 2271/02; B01D 2271/022; B01D 2271/025; B01D 2271/027; B01D 2311/26; B01D 46/20; B01D 46/26; B01D 46/0056
   See application file for complete search history.

(56) References Cited

U.S. PATENT DOCUMENTS

| | | | | |
|---|---|---|---|---|
| 4,251,237 | A | * | 2/1981 | Smith .................. B01D 46/682 95/278 |
| 5,112,485 | A | | 5/1992 | Hirs |
| 10,596,505 | B1 | * | 3/2020 | Dietz .................... B01D 46/46 |
| 2010/0032383 | A1 | | 2/2010 | Gaiser et al. |
| 2010/0088864 | A1 | | 4/2010 | Duer |
| 2022/0001320 | A1 | * | 1/2022 | Carver, Sr. ......... B01D 46/0005 |

OTHER PUBLICATIONS

International Search Report and Written Opinion in corresponding PCT Application No. PCT/US2019/023678, dated Jun. 10, 2019.
U.S. Appl. No. 16/492,853, filed Sep. 10, 2019.
Canadian Patent Application No. 3,058,422, filed Oct. 30, 2019.

* cited by examiner

MODULAR DUST COLLECTION SYSTEM

FIELD

The present application relates to filter dust collection systems, and particularly to the support structure for a drum filter dust collection system.

BACKGROUND

Filter dust collection systems, and particularly drum filter dust collection systems are used for energy efficient filtration of large volumes of air to remove fibrous dust such as wood, polystyrene, insulation material, natural material, etc. from the air and replace it with clean air. A typical drum filter of the type contemplated in the present application is stationary and can be bolted directly to a wall opening. The incoming air flows from the inside to the outside and exists the drum across the entire filter surface. Rotating and reciprocating suction nozzles inside of the drum continuously vacuum dust and waste from the interior surface of the filter media. Little air is required to clean the filter medium as the suction nozzles are efficient. The nozzles are fluidic optimized and touch the filter media, which may allow for efficient cleaning.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

The present application discloses a support frame for dust collection system including a drum filter and a filter cleaning system. The support frame includes a plurality of octagonal supports spaced apart from each other in an axial direction. Each octagonal support includes a plurality of frame members that define an octagon-shaped peripheral profile and outline an octagon-shaped opening. A plurality of axial members extend between adjacent octagonal supports of the plurality of octagonal supports. One of the plurality of octagonal supports is configured as a first end support positioned at a first end of the support frame and a different one of the plurality of octagonal supports is configured as a second end support positioned at a second end of the support frame. The first end support and the second end support each include an end cover secured to the frame members of the first end support and the second end support to cover the octagon-shaped opening between the frame members. Each cover includes a first inlet opening and a second inlet opening.

In certain embodiments, each end cover includes a first end plate covering an upper half of the octagon-shaped opening and a second end plate covering a lower half of the octagon-shaped opening. In this embodiment, the first inlet openings are formed in the first end plates and the second inlet openings are formed in the second end plates. An inlet cover may be configured to be removably secured to at least one of the cover plates to seal one of the first inlet openings or one of the second inlet openings.

In other embodiments, the first end support and the second end support each include a mounting support structure that extends between the frame members of the first end support and the second end support. The mounting support structure is configured to rotatably support a hollow shaft of the filter cleaning system that extends from the first end to the second end. The mounting support structure of the first end support may include a motor mount plate supporting a direct rotational drive configured to rotate the filter cleaning system. The motor mount plate may include an opening configured to receive a drive shaft that extends from the hollow shaft to engage the direct rotational drive. The mounting support structure of the second end support may include a roller mount plate and a plurality of rollers arranged around a conduit opening in the roller mount plate that are configured to receive an outlet conduit that extends from the hollow shaft to the plurality of rollers through the conduit opening. In certain embodiments, four rollers are evenly spaced around the conduit opening and are configured to restrict horizontal and vertical movement of the outlet conduit and the hollow shaft.

In still other embodiments, the support frame is divided into a plurality of frame segments arranged in an end-to-end fashion along the axial direction. Each frame segment includes two adjacent octagonal supports of the plurality of octagonal supports. A set of axial members of the plurality of axial members extend between the two adjacent octagonal supports. The plurality of frame segments includes a first end frame segment including the first end support and a second octagonal support of the first end frame segment adjacent the first end support; The plurality of frame segments include a second end frame segment including the second end support and a second octagonal support of the second end frame segment adjacent the second end support. The plurality of frame segments may be interconnected such that each frame segment shares at least one octagonal support with an adjacent frame segment. The plurality of frame segments may include an interior frame segment positioned between the first end segment and the second end segment. The interior frame segment includes the second octagonal support of the first end frame segment and the second octagonal support of the second end frame segment.

In certain embodiments each of the octagonal supports includes support legs extending outward from at least one of the frame members in a lateral direction. A distal end of each leg may be positioned within a footprint of the support frame. The plurality of axial members may extend between corners of the adjacent octagonal supports.

The present application also discloses a dust collection system having a plurality of modular sections arranged in an end-to-end fashion in an axial direction from a first end to a second end. Each of the modular sections includes a frame segment of a support frame. The frame segments include two adjacent octagonal supports spaced apart from each other in the axial direction and a plurality of axial members extending between the adjacent octagonal supports. A filter segment of a drum filter is secured to the frame segment and extends in the axial direction from the two adjacent octagonal supports. A cleaner segment of a filter cleaning assembly is positioned within the filter segment. The cleaner segment includes a shaft segment extending along the axial direction and a plurality of suction nozzles connected to the shaft segment configured to clean the filter segment. The plurality of modular sections include a first end modular section that extends from a first end octagonal support at the first end to a first interior octagonal support, and a second end modular section that extends from a second end octagonal support at the second end to a second interior octagonal support.

In certain embodiments, the plurality of modular sections are interconnected such that at least one of the two adjacent octagonal supports of each modular segment is a shared octagonal support that is also part of an adjacent one of the modular segments. The plurality of modular sections may include an interior modular section that shares the first interior octagonal support with the first end modular section and the second interior octagonal support with the second end modular section.

In other embodiments, the drum filter defines a cylindrical interior filter space that extends along the axial direction from the first end octagonal support to the second end octagonal support. The interior filter space is enclosed by a first cover plate secured to the first end octagonal support and a second cover plate secured to the second end octagonal support. At least one of the first cover plate and the second cover plate includes an inlet opening into the interior filter space. The shaft segments from the cleaner segment in each of the plurality of modular sections may be coupled together in an end-to-end fashion to form a hollow shaft of the filter cleaning assembly. The first cover plate and the second cover plate may each include a first inlet opening positioned above the hollow shaft and a second inlet opening positioned below the hollow shaft.

In still other embodiments, the shaft segments from the cleaner segment in each of the plurality of modular sections may be coupled together in an end-to-end fashion to form a hollow shaft of the filter cleaning assembly. The hollow shaft may be rotatably supported on at least one of the first end octagonal support and the second end octagonal support. A motor may be placed in direct operative engagement with a drive shaft extending from the hollow shaft. The motor would be configured to rotate the hollow shaft thereby rotating the filter cleaning assembly. In these embodiments, each of the suction nozzles may secured to a distal end of an arm that extends radially outward from each of the shaft segments. The suction nozzles may be positioned so that a nozzle tip of each suction nozzle is in contact with an inner surface of the drum filter or positioned proximate the inner surface. Rotation of the filter cleaning assembly causes the plurality of suction nozzles to travel circumferentially around the inner surface of the drum filter. Each of the suction nozzles may include a flexible section configured to deflect the nozzle tip without damaging the suction nozzle.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
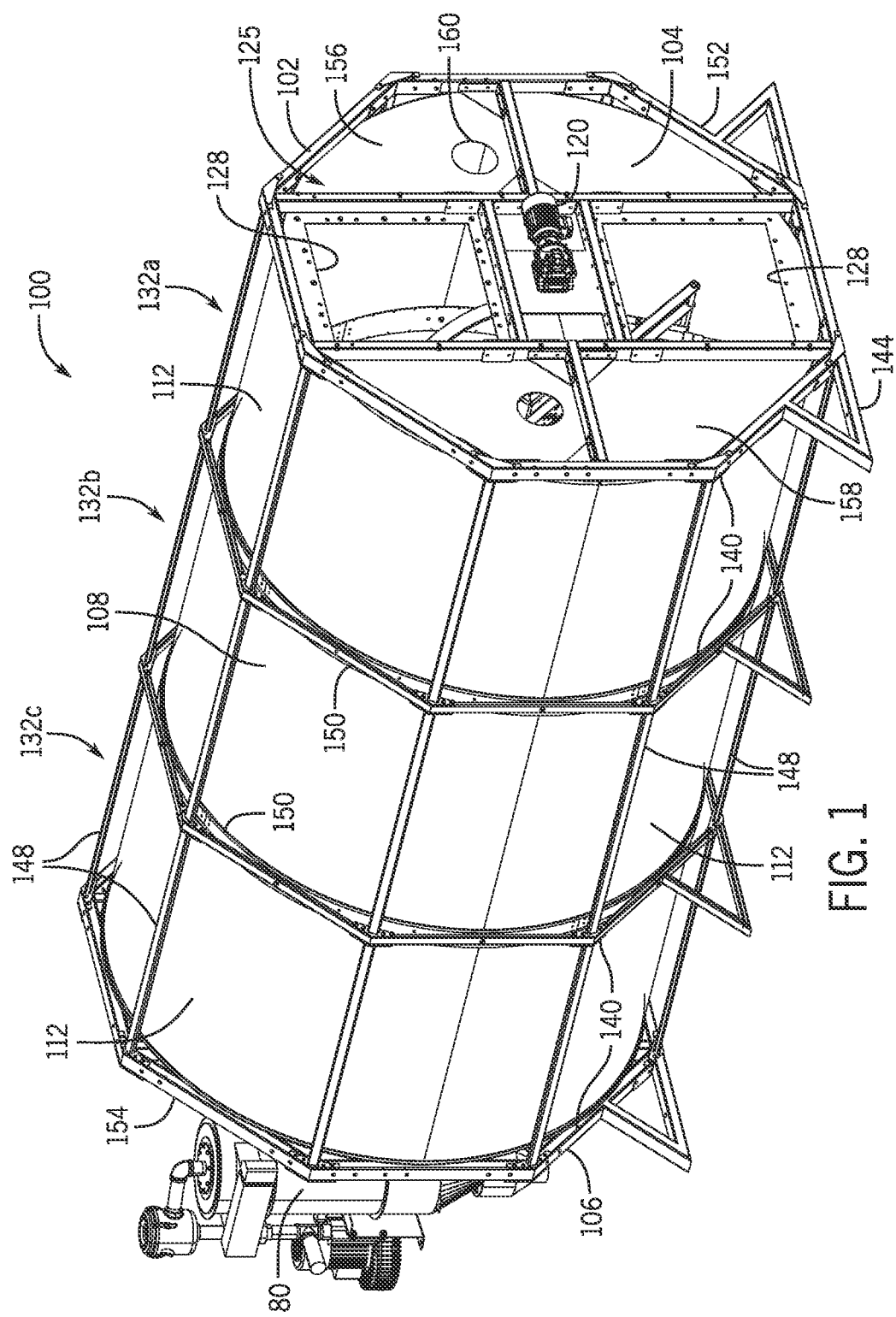
FIG. 1 is a perspective view of a modular dust collection system including a support frame and a drum filter.

In the present description, certain terms have been used for brevity, clarity and understanding. No unnecessary limitations are to be inferred therefrom beyond the requirement of the prior art because such terms are used for descriptive purposes only and are intended to be broadly construed. The different methods and assemblies described herein may be used alone.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left" or "right" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements or machines from another.

Through their research and experience in the relevant field, the present inventors have recognized that challenges currently exist relating to transporting, assembling, and operating dust collection systems. Existing large format dust collection systems may include components and subassemblies with large footprints that make shipping difficult.

Transporting preassembled sections of existing systems may be difficult or impossible due to their size. This increases the amount of assembly that must be conducted on site, which is further complicated by use of a large number of non-standard components in the frame. The inventors further recognized that the chain drive mechanisms of existing dust collection systems can require significant amounts of maintenance and may include several wear components that need to be replaced or repaired frequently. Existing suction nozzles may similarly include components that are prone to breaking, thereby increasing operational costs.

Figure 2:
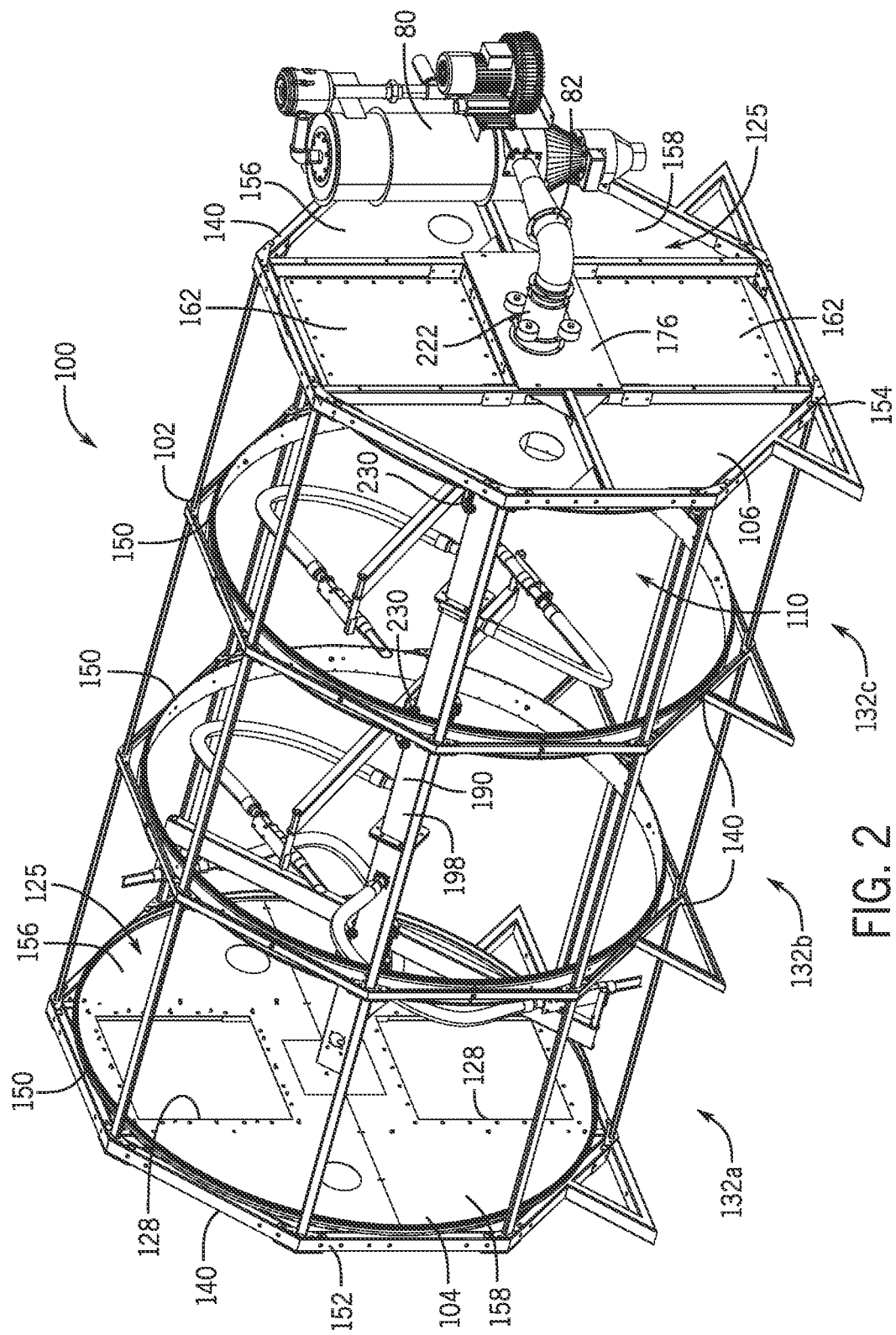
FIG. 2 is another perspective view of the modular dust collection system of FIG. 1 with the drum filter removed to show the filter cleaning assembly.
Figure 3:
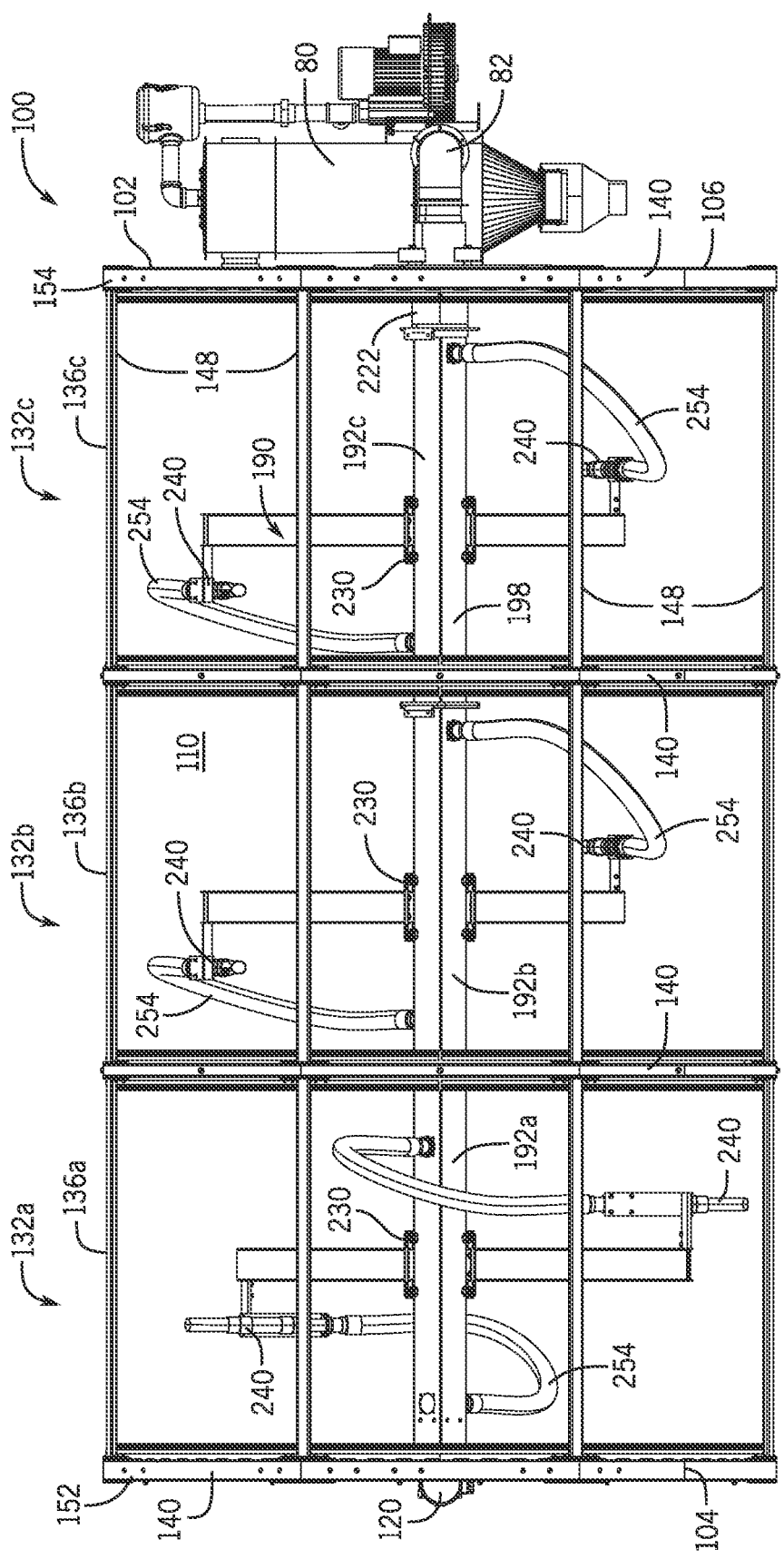
FIG. 3 is a side view of the modular dust collection system of FIG. 2.

Upon recognition of the foregoing problems and challenges, the inventors developed the disclosed modular drum dust collection system. Referring now to the figures, FIGS. 1-3 illustrate an embodiment of a modular dust collection system 100 includes a support frame 102 that extends from a first end 104 of the dust collection system 100 to a second end 106 and a cylindrical drum filter media 108 that is mounted within the support frame 102 and extending from the first end 104 to the second end 106. The drum filter media 108 may define an inner filter space 110 that is bound by end plates 156, 158 at the first end 104 and the second end 106 and a plurality of air-permeable filter segments 112, each formed in a cylinder, that extend between the first and second ends 104, 106 to enclose the inner filter space 110. The support frame 102 and the drum filter 108 may be divided into a plurality of interconnected modular sections 132, each one extending axially between two octagonal supports 140. In some embodiments, the modular segments 132 may be dimensioned to fit within a shipping container so that the modular segments 132 may be prefabricated before shipping. This may be useful, for example in order to increase the ease of installation.

Figure 7:
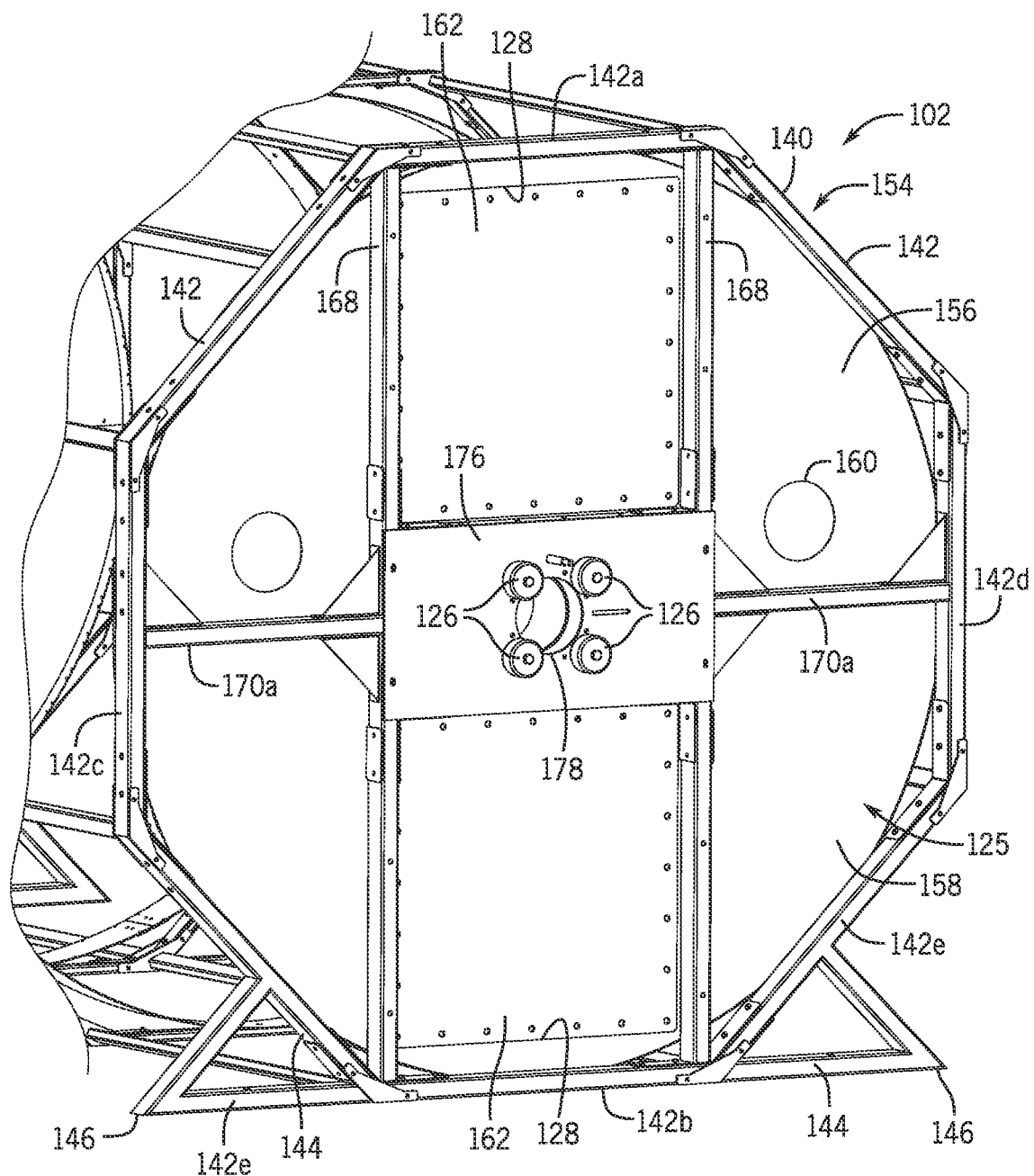
FIG. 7 is a detailed perspective view of the second end of the modular dust collection system of FIG. 6.

A rotating and reciprocating filter cleaning assembly 190 is axially positioned within the drum filter 108 and may include a hollow shaft 198 that is rotatably mounted on the support frame 102 at the first and second ends 104, 106 and a plurality of suction nozzles 240 connected to the hollow shaft 198 by rolling carriages 230. The filter cleaning assembly 190 may be configured to vacuum dust and waste from the interior surface of the drum filter 108. A direct rotational drive 120 may be mounted on the first end 104 and can be configured to rotate the hollow shaft 198 with the connected suction nozzles 240. The direct rotational drive 120 may include fewer wear components that need frequent replacement than previous chain-drive systems. Proximate the second end 106, the hollow shaft 198 may be connected to an outlet conduit 222 that extends through the end plate 176 at the second end 106 and is supported by a plurality of roller supports 126 (FIG. 7).

During operation of the dust collection system 100, dust and particle laden air may be pushed and/or drawn into the inner filter space 110 of the drum filter media 108 through an inlet opening 128 formed in the support frame 102 at least one of the first end 104 and the second end 106. The air is forced through the drum filter media 108, depositing dust and other particulate debris on the interior surface of the drum filter media 108. As the filter cleaning assembly 190 rotates and reciprocates, the dust and debris may be vacuumed from the filter segments 112 by the suction nozzles 240 and drawn into the hollow shaft 198 through a connecting hose 254. The collected particulate may then be sucked out of the hollow shaft 198 through the outlet conduit 222 and into a duct 82 for a cyclone separator 80 configured to collect the dust and any other debris.

Figure 4:
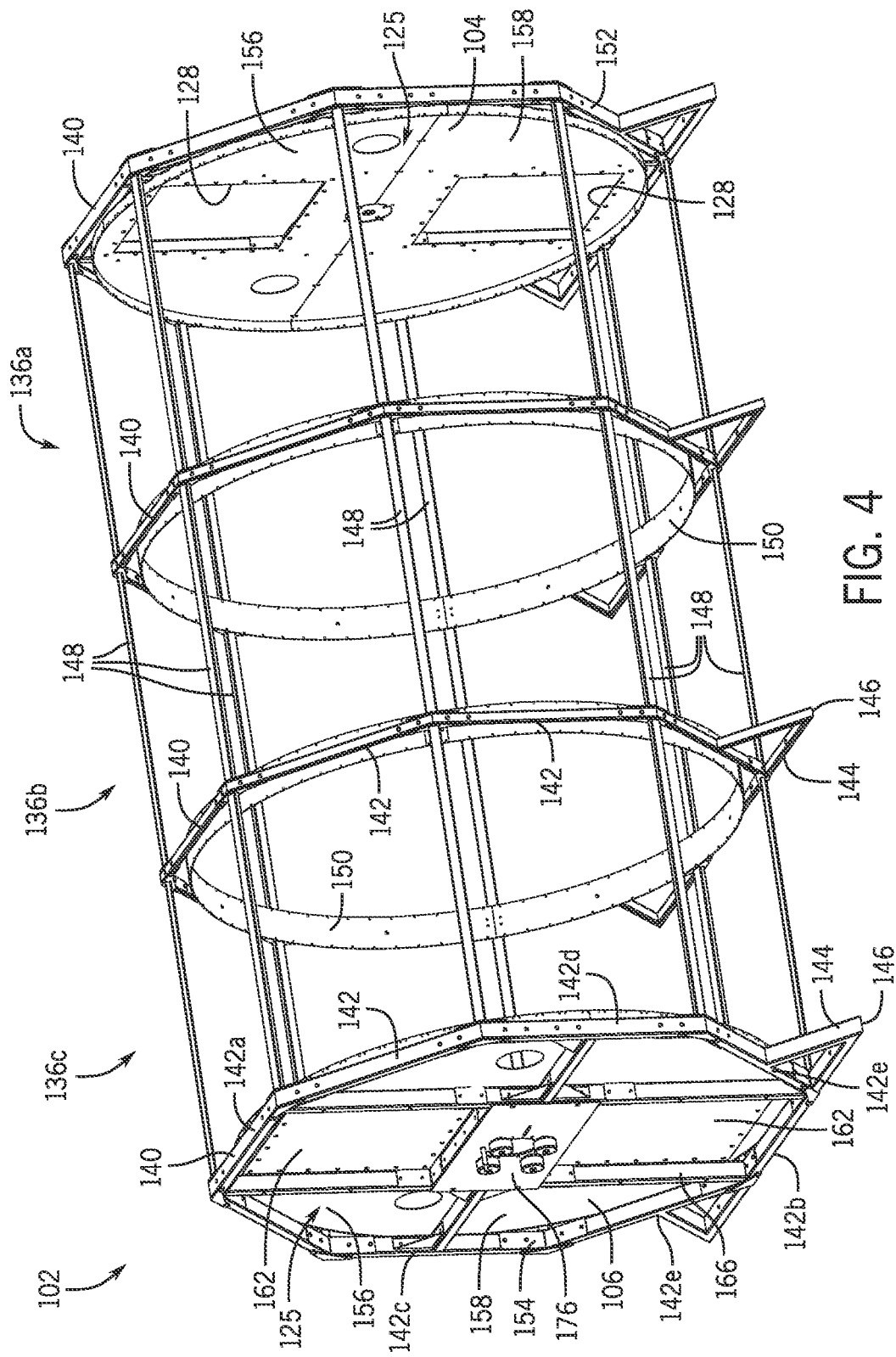
FIG. 4 is a perspective view of the support frame of FIG. 3.
Figure 5:
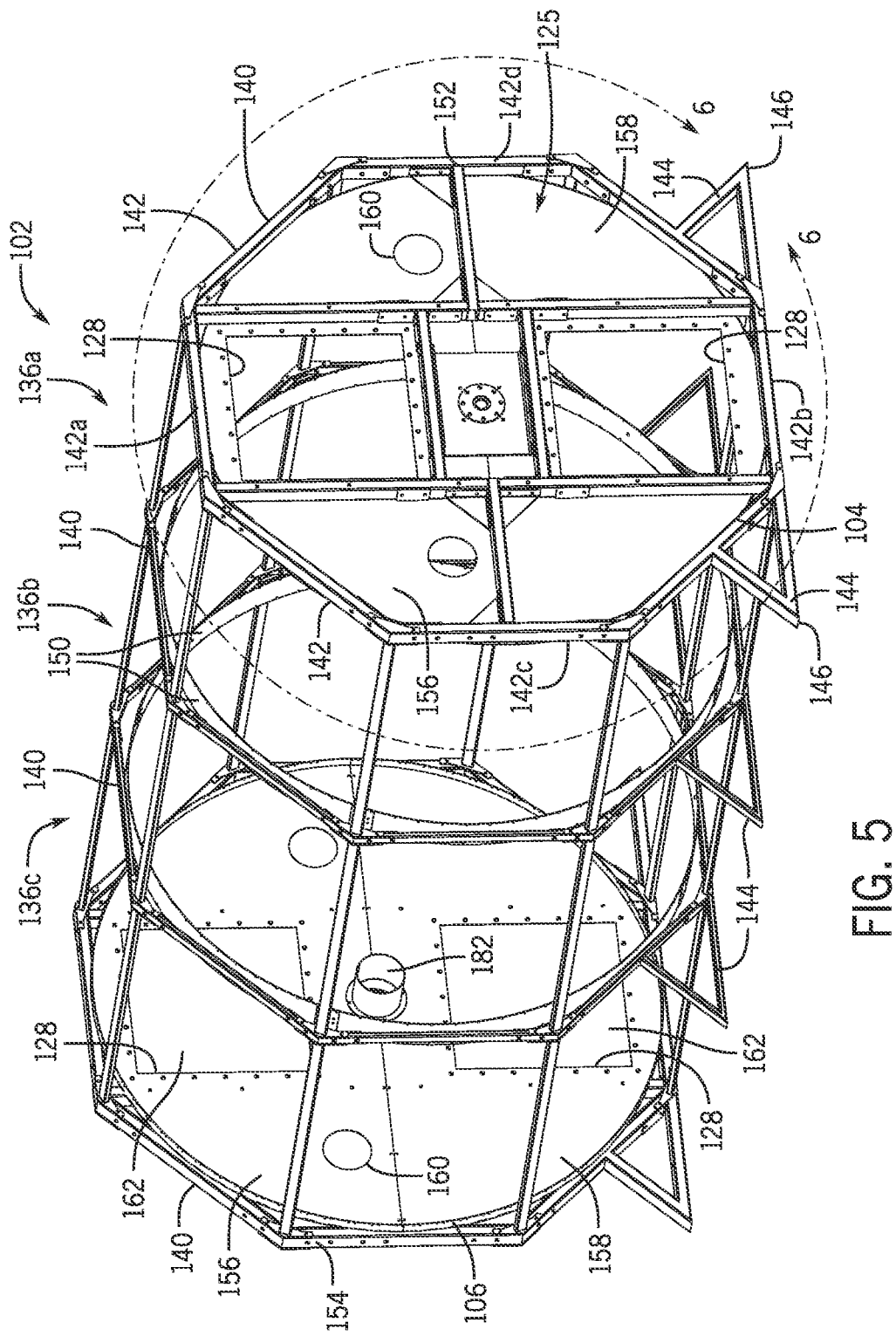
FIG. 5 is another perspective view of the support frame of FIG. 4.

Having generally described features of a modular dust collection system 100, the details of its components and their structure and features will now be discussed. As illustrated in FIGS. 4 and 5, embodiments of a support frame 102 may include a plurality of octagonal supports 140 arranged axially between the first end 104 and the second end 106 of the modular dust collection system 100. Each of the octagonal supports may include a plurality of frame members arranged to form an octagon-shaped profile. In the illustrated embodiments, for example, the octagonal supports 140 include eight frame members 142 having equal lengths, and each of the frame members 142 is connected to two adjacent frame members 142 to form a closed peripheral profile in the shape of an equilateral octagon. The octagonal supports 140 may be oriented so that top frame member 142a and a bottom frame member 142b are generally horizontal and respectively define an upper extent and a lower extend of the support frame 102, and left and right frame members 142c, 142d are generally vertical and define the lateral extents of the support frame 102. Frame members 142 may be coupled to each other by mechanical fasteners (for example, nuts and bolts, screws, etc.), and support brackets may be included to strengthen the joints.

Some embodiments of a modular dust collection system 100 may include at least one octagonal support that is configured differently than the illustrated octagonal supports 140. For example, an octagonal support may include at least one frame member having a different length than another one of the frame members, and/or at least one pair of frame members may be connected to each other at an angle that is different than the connection between a different pair of frame members to form an octagonal support with an irregular octagon-shaped profile. Additionally or alternatively, at least two frame members 142 may be coupled using adhesives, welds, or other any other method, and/or integrally formed as a single component. In some embodiments, an octagonal support 140 may be manufactured as a single unitary part.

In some embodiments, at least one of the octagonal supports 140 may include support legs 144 extending laterally outward from at least one of the frame members 142. In the illustrated embodiments, for example, the octagonal supports 140 may include legs 144 that integrally formed with a lower angled frame members 142e that extend between the bottom frame member 142b and the left and right frame members 142c, 142d. Each of the legs 144 may include a horizontal first segment extending laterally from the frame member 142e proximate the intersection between the bottom frame member 142b and the lower angled frame member 142e and a second segment extending from the lower angled frame member 142e and intersecting with the first segment at the distal end 146 of the leg 144.

Some embodiments, however, may include at least one support leg that is different than those of the illustrated embodiments. For example, at least one of the legs may include one segment that intersects with a different portion of the lower angled frame member and/or a different portion of the other segment. While the illustrated legs are integrated with the lower angled frame member, at least one of the legs may be configured as a separated part that is connected to at least one of the lower angled frame members, a different one of the frame members, and any other portion of an octagonal support. Additionally or alternatively, a support leg may be configured as a single beam segment that extends outward from the octagonal support.

With continued reference to FIGS. 4 and 5, each octagonal support 140 is connected to adjacent octagonal supports 140 by at least one axial member 148 extending between the adjacent octagonal supports 140. The illustrated embodiments may include eight axial members 148 that extend between corresponding corners of adjacent octagonal supports 140. Some embodiments, however, may include a different number of axial members, and at least one axial member may connect to a different part of an octagonal support. The illustrated octagonal supports 140 are uniformly spaced apart from each other along an axial direction. This may be useful, for example, in order to form uniformly sized modular frame segments 136 arranged linearly in axial direction. Each frame segment 136 extends from a first one of the octagonal supports 140 to a second octagonal support 140 adjacent the first octagonal supports 140. Adjacent modular frame segments 136 share a common octagonal support 140, with each frame segment 136 including axial members 148 connecting to opposite sides of the shared octagonal support. For example, the illustrated support frame includes a first end frame segment 136a at the first end 104 of the dust collection system 100, a second end frame segment 136b at the second end 106, and an interior frame segment 136c positioned between the first and second end segments. The two interior octagonal supports 140, both of which are part of the interior frame segment 136c, are also part of either the first end frame segment 136a or the second end frame segment 136b. Thus, adjacent frame segments 136 are interconnected with each other.

Some embodiments of a support frame 102 may include at least one frame segment 136 that does not share any octagonal supports 140 with other frame segments 136. In such an embodiment, octagonal supports 140 of separate adjacent frame segments 136 may be secured to each other using mechanical fasteners, adhesives, welds, or any other method for connecting the octagonal supports. Additionally or alternatively, the spacing between at least one set of adjacent octagonal supports 140 may be different than the spacing between a different set of octagonal supports 140 to define differently sized frame segments 136.

Embodiments of a support frame 102 may include mounting features configured to support the filter segments 132 of the drum filter. In the illustrated embodiments, for example, the support frame 102 may include annular frame members 150 positioned within the perimeter of each of the octagonal supports 140 such that the annular frame members 150 are coaxial. Each annular frame member 150 may be secured to one of the octagonal supports 140 by a mechanical fastener positioned proximate a midpoint of each of the frame members 142. Some embodiments, however, may use mechanical fasteners in a different configuration and/or alternative methods for attaching the annular frame members 150 to the octagonal supports 140 such as adhesives, welds, and any other coupling method.

The plurality of annular frame members 150 may define a cylindrical periphery and a cylindrical inner filter 110 space, and the annular frame members 150 can be configured to support filter segments 112 between each of the octagonal supports 140. For example, the circumferential edges of each annular frame member 150 can include connecting strips configured to engage the edges of a filter media sheet, as described in U.S. patent application Ser. No. 16/492,853, filed Sep. 10, 2019, and WO 2020/197538, filed Mar. 22, 2019 and published on Oct. 1, 2020, the entire contents of which are hereby incorporated by reference. When supported by the annular frame members 150, the filter media sheet may wrap around the cylindrical periphery in order to form a cylindrical filter segment 112 that may enclose the inner filter space 110 (see FIG. 1). When the filter segments 112 are secured to the annular frame members 150, the drum filter media 108 extends in a substantially continuous cylinder from an octagonal support 140 configured as a first end support 152 at the first end 104 and another octagonal support 140 configured as a second end support at the second end 106.

Some embodiments may be configured with at least one different mounting feature for a drum filter and/or a filter segment of a drum filter. For example, at least one of the annular frame members 150 may be omitted so that a filter segment 132 passes through an octagonal support 140 without connecting to that octagonal support 140. Some embodiments can include an annular frame member 150 that is integrally formed in an octagonal support 140, and/or an octagonal support 140 can include an engagement feature configure to connect directly to a filter media sheet.

Figure 6:
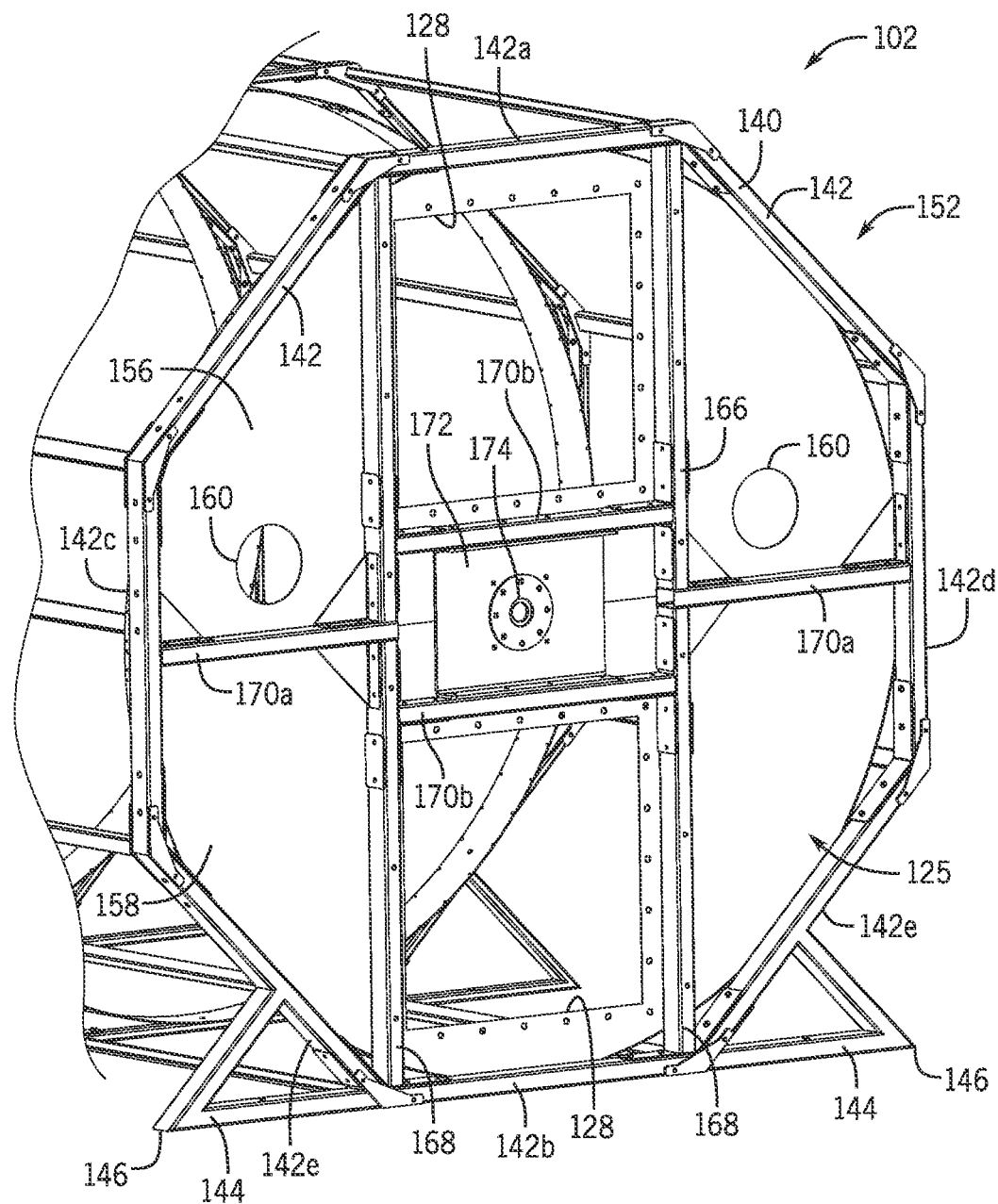
FIG. 6 is a detailed perspective view of the first end of the modular dust collection system of FIG. 3.

Embodiments of a support frame 102 may include at least one end cover 125 secured to the octagonal supports 140 at the first and second ends 104, 106, respectively, of the support frame 102 in order to close off the axial ends of the cylindrical inner filter space 110. For example, as illustrated in FIGS. 6 and 7, end cover 125 including and upper end plate 156 and a lower end plate 158 may be secured to the first end support 152 and the second end support 154, thereby sealing the axial ends of and enclosing the inner filter space 110. Each of the end plates 156, 158 may be configured to partially cover the open area between the frame members 142 of the octagonal support structures 140. In certain embodiments, the upper end plate 156 is a first end plate covering an upper half of the octagon-shaped opening and the lower end plate 158 is a second end plate covering a lower half of the octagon-shaped opening. The upper end plate 156 may be dimensioned to overlap with a portion of the top frame member 142a, the left and right frame members 142c, 142d, and the angled frame members 142 linking the top frame member 142a, the left and right frame members 142c, 142d. Similarly, the lower end plate 158 may be dimensioned to overlap with a portion of the bottom frame member 142b, the left and right frame members 142c, 142d, and the angled frame members 142e linking the bottom frame member 142b, the left and right frame members 142c, 142d.

The upper and lower end plates 156, 158 may each include an inlet opening 128 providing access to the inner filter space 110 through the respective end plate 156, 158. The inlet openings 128 may be rectangular and generally positioned at the midpoint between lateral sides of the support frame 102. Additionally, the upper end plates 156 may include view ports 160 positioned to the left and right of the inlet opening 128. In some embodiments of a modular dust collection system, at least one of the inlet openings 128 may be sealed when fewer than the maximum number of inlet openings 128 are required. In the illustrated embodiments, for example, the inlet openings 128 at the second end 106 of the support frame 102 are sealed with cover plates 162. The cover plates 162 may be removable and interchangeable so that each cover plate can be used to seal any of the inlet openings 128. In some embodiments, providing an inlet 128 proximate the top and bottom of the inner filter space 110 may help to improve air circulation and reduce turbulence within the inner filter space. This may be useful, for example, to reduce particulate clump buildup within the drum filter 108, thereby reducing maintenance needs and extending the life of the filter media.

Some embodiments may include at least one of an upper end plate and a lower end plate that is different than those of the illustrated embodiments. For example, at least one of the upper and/or lower end plates can be configured with a differently shaped or sized inlet opening, and/or at least one of the inlet openings may be positioned in a different location. At least one of the end plates may include at least one additional inlet opening and/or view port, and/or at least one inlet opening and/or view port may be omitted. Additionally or alternatively, a support frame may include end plates configured to cover different portions of open area between frame members of the octagonal support, such as end plates configured to cover the left and right sides of the open area. Further still, some embodiments may include more than two end plates a configured to cover one axial end of a modular dust collection system, and/or a single end plate configured to cover open area between frame members of the octagonal support.

Embodiments of a support frame 102 may include additional support members and mounting features the first end and/or the second end to support the filter cleaning assembly on the support frame. For example, as illustrated in FIGS. 6 and 7, the octagonal supports 140 configured as the first and second end supports 152, 154 may each include a mounting support frame 166 with support members 168, 170 that extend between the sides of the octagonal support 140. Each mounting support frame 166 may include laterally spaced apart vertical members 168 extending from the top frame member 142*a* to the bottom frame member 142*b* and horizontal members 170*a* extending laterally outward from each vertical member to the left frame member 142*c* or the right frame member 142*c*. Additionally, vertically spaced apart horizontal members 170*b* may extend between the two vertical members 168 and be configured to support for the filter cleaning assembly mounting features. Some embodiments of a mounting support frame may include a different support member configuration. For example, a mounting support frame 166 may include a different number of vertical members and/or horizontal members, and at least one of the vertical members and horizontal members may be positioned differently than those of the illustrated embodiments.

As illustrated in FIG. 6, the first end support 152 may include a motor mount plate 172 positioned between the vertical members 168 and the spaced apart horizontal members 170*b* of the mounting support frame 166. The motor mount plate 172 may include an opening 174 configured to receive a shaft 210 from the filter cleaning assembly 190 (see FIG. 11), and the opening 174 may be aligned with corresponding openings formed through the end plates 156, 158. As illustrated in FIG. 7, the second end support 154 may include a roller mount plate 176 that is secured to an outer surface of at least one of the vertical members 168 and the spaced apart horizontal members 170*b*. The roller mount plate 176 may include a central opening 178 aligned with corresponding openings in the end plates 156, 158 and four roller supports 126 arranged around the opening 178. The roller supports 126 may be configured to support a corresponding shaft mounting feature of the filter cleaning assembly 190 while permitting it to rotate (see FIG. 12). Some embodiments may include at least one of a motor mount plate and a roller mount plate that is configured differently than those of the illustrated embodiments.

Figure 8:
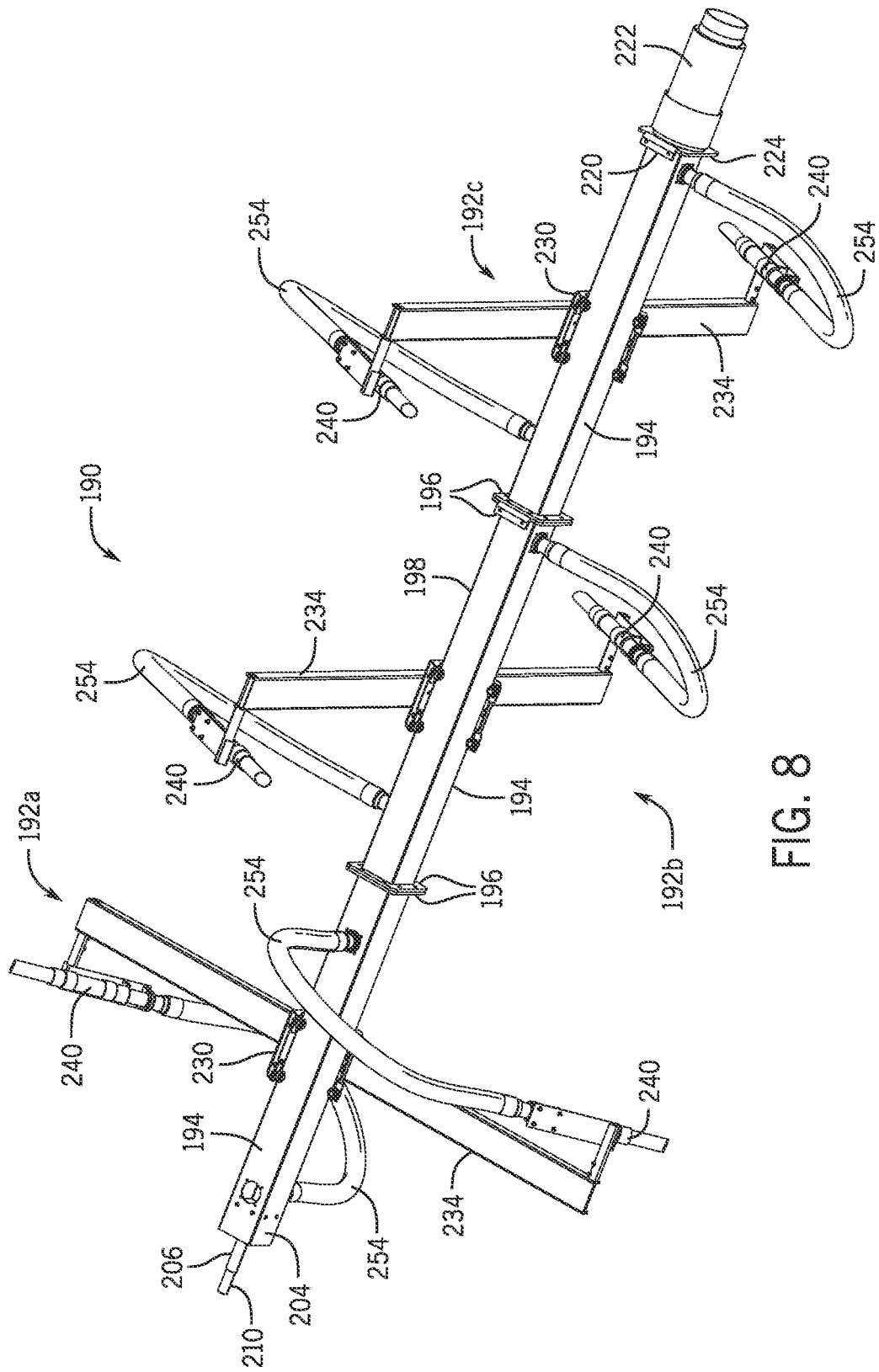
FIG. 8 is a perspective view of the filter cleaning assembly from the modular dust collection system of FIG. 7.
Figure 9:
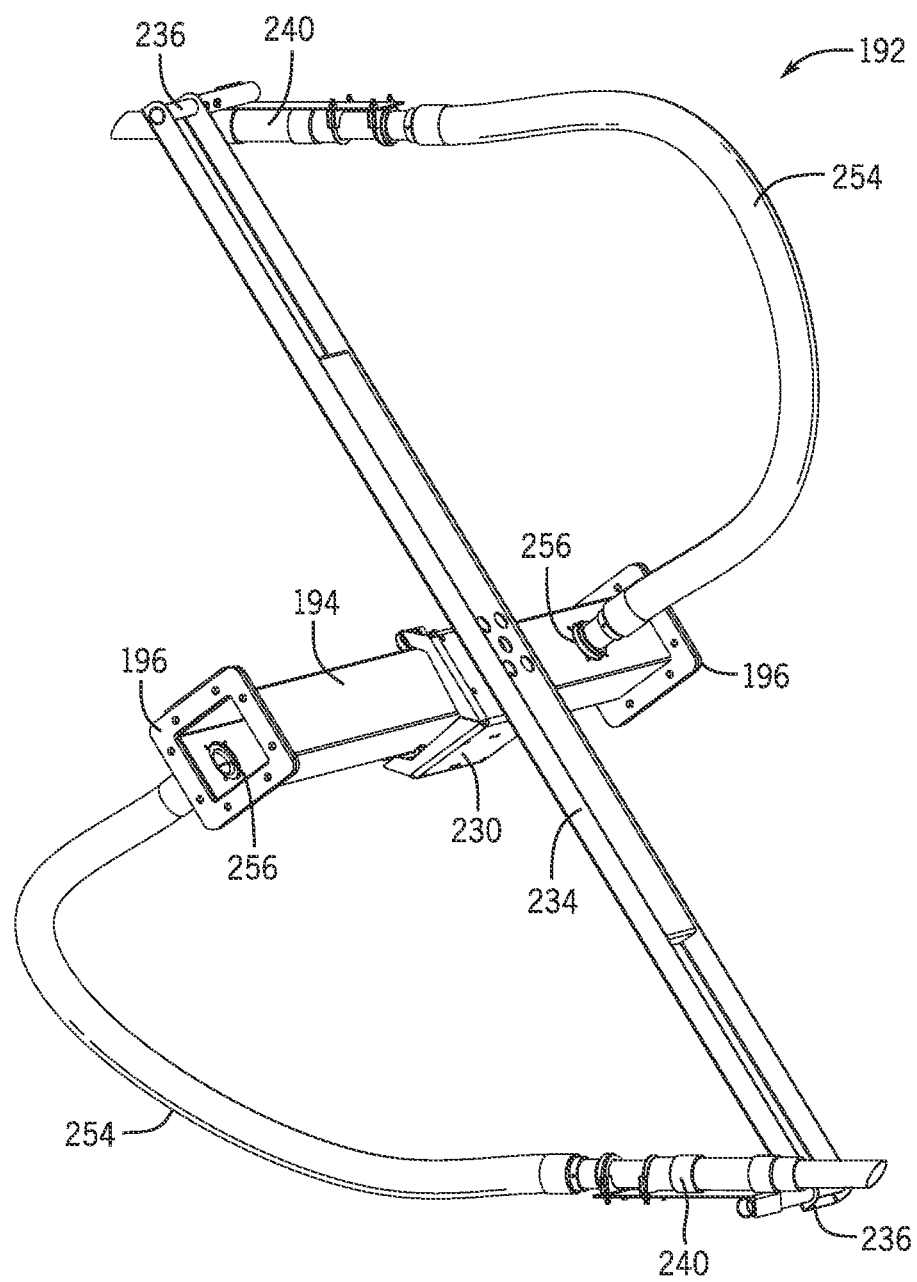
FIG. 9 is a perspective view of a cleaner segment of the filter cleaning assembly of FIG. 8.

Embodiments of a filter cleaning assembly 100 may include a plurality of modular segments that can be linked together to form the complete cleaning assembly. For example, as illustrated in FIGS. 8 and 9, the filter cleaning assembly 190 may include a plurality of cleaner segments 192 that are configured to be connected to each other to form the axially extending filter cleaning assembly 190. Each cleaner segment 192 may include a hollow shaft segment 194 that extends between opposite axial ends thereof. At least one axial end of each shaft segment 194 may include a flange 196 that can be used to couple the shaft segments 194 together in an end-to-end fashion to collectively form a continuous hollow shaft 198.

Figure 10:
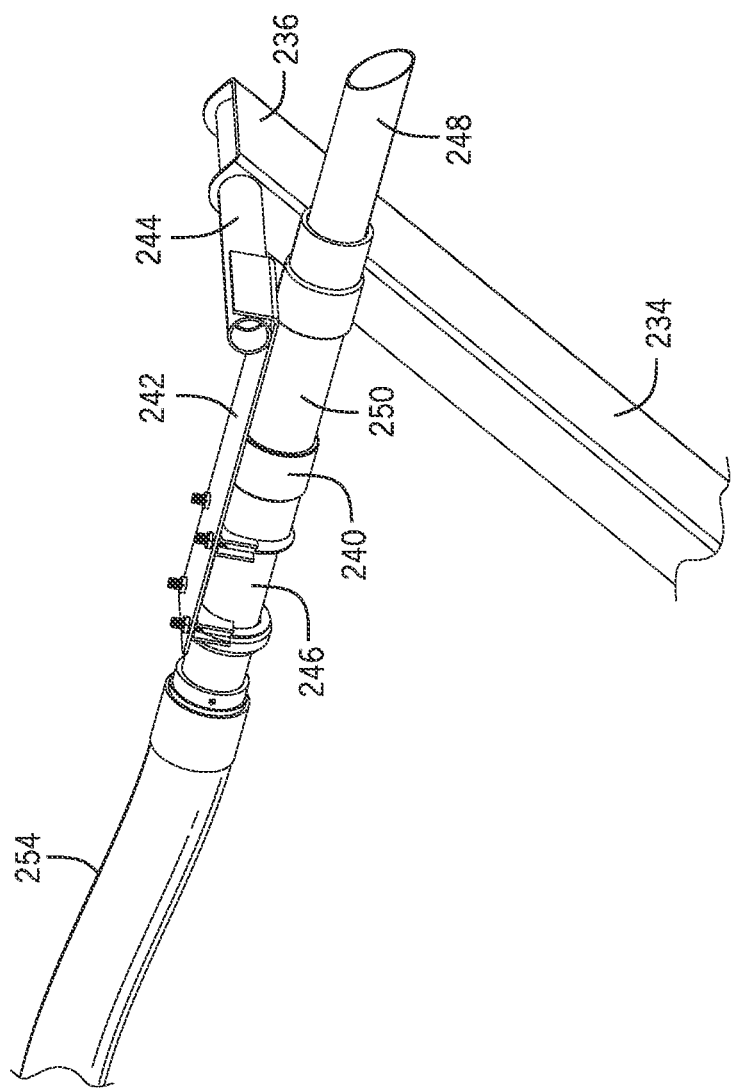
FIG. 10 is a detailed perspective view of a suction nozzle of FIG. 9.

In some embodiments, the cleaner segments 192 may be configured to have substantially the same dimensions and components so that the cleaner segments are interchangeable with each other. In the illustrated embodiments, for example, each cleaner segment 192 may include a shaft segment 194 with a generally square cross-sectional profile and a carriage 230 mounted on the shaft segment 194. The carriage 230 may extend around the shaft segment 194 and can include a plurality of rollers 232 that contact at least three sides of the shaft segment 194. Engagement between the rollers 232 and the sides of shaft segment 194 may secure the carriage 230 thereto while allowing the carriage 230 to move axially along the length of the shaft segment 194. An arm 234 may be secured to each carriage 230 and can extend radially outward from the shaft segment 194 in opposite directions to opposite distal ends 236 of the arm 234. A suction nozzle 240 configured to clean the interior of the drum filter 108 may be coupled to each distal end 236 of the arm 234. Referring to FIG. 10, each suction nozzle 240 may be secured to a mounting bracket 242 that is connected to the arm 234 by a shaft 244. In some embodiments, the shaft 244 may be rotatably secured to at least one of the arm 234 and the mounting bracket 242 so that the suction nozzle 240 can rotate relative to the arm 234. Other embodiments, however, may include a shaft 244 that is rigidly connected to the arm 234 and the mounting bracket 242. In such an embodiment, the angle of the suction nozzle 240 relative to the arm 234 may be selected in order to place the nozzle tip 248 in contact with the interior surface of the drum filter 108 or proximate the interior surface of the drum filter 108.

With continued reference to FIGS. 9 and 10, the suction nozzles 240 are configured as linear nozzles with a rigid section 246 that may be connected to the mounting bracket 242, a nozzle tip 248, and flexible section 250 connecting the rigid section 246 to the nozzle tip 248. The illustrated flexible section 250 is configured as a flexible hose with an integrated spring. When an external force is applied to nozzle tip 248, the flexible section 250 may allow the nozzle tip 248 to deflect without damaging the suction nozzle 240, and the integrated spring biases the nozzle tip 248 back to its original position after the external force is removed. Each suction nozzle 240 is connected to the shaft segment 194 by a hose 254 that extends from the rigid section 246 of the suction nozzle to a shaft opening 256 formed in a side of the shaft segment 194, thereby placing the suction nozzle 240 in fluid communication with the interior passageway that extends along the length of the hollow shaft 198.

In some embodiments, the length of each shaft segment 192 may correspond to the length of the frame segments so that the hollow shaft 198 extends substantially the full axial length of the support frame 102 and shaft mounting features at the axial ends of the hollow shaft 198 can engage corresponding frame mounting features in the first end support 152 and the second end support 154. For example, referring to FIGS. 8 and 11, a first axial end 204 of the hollow shaft 198 may include a drive shaft mounting feature 206 including an attachment portion 208 configured to be received within the opening at the end of the hollow shaft 198 and a drive shaft 210 projecting away from the attachment portion 208 in the axial direction. The attachment portion 208 may seal the opening in the first axial end 204 of the hollow shaft 198. When the filter cleaning assembly 190 is received on the support frame 102, the drive shaft 210 may extend through the opening(s) in the end plates 156, 158 and the opening 174 in the motor mount plate 172 to engage the direct rotational drive 120, which may be mounted on the motor mount plate 172.

Figure 11:
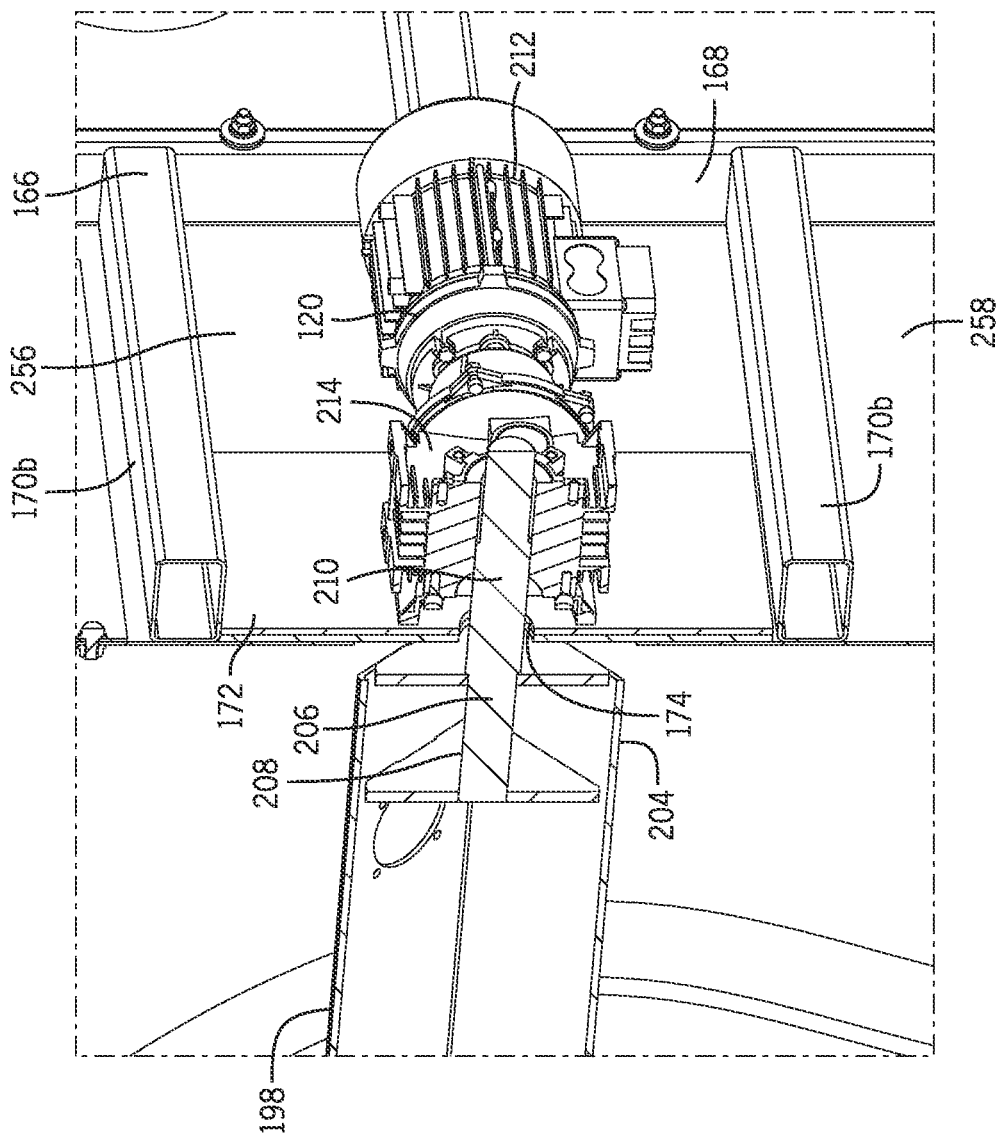
FIG. 11 is a cross-sectional perspective view of the first end of the modular dust collection system of FIG. 7.
Figure 12:
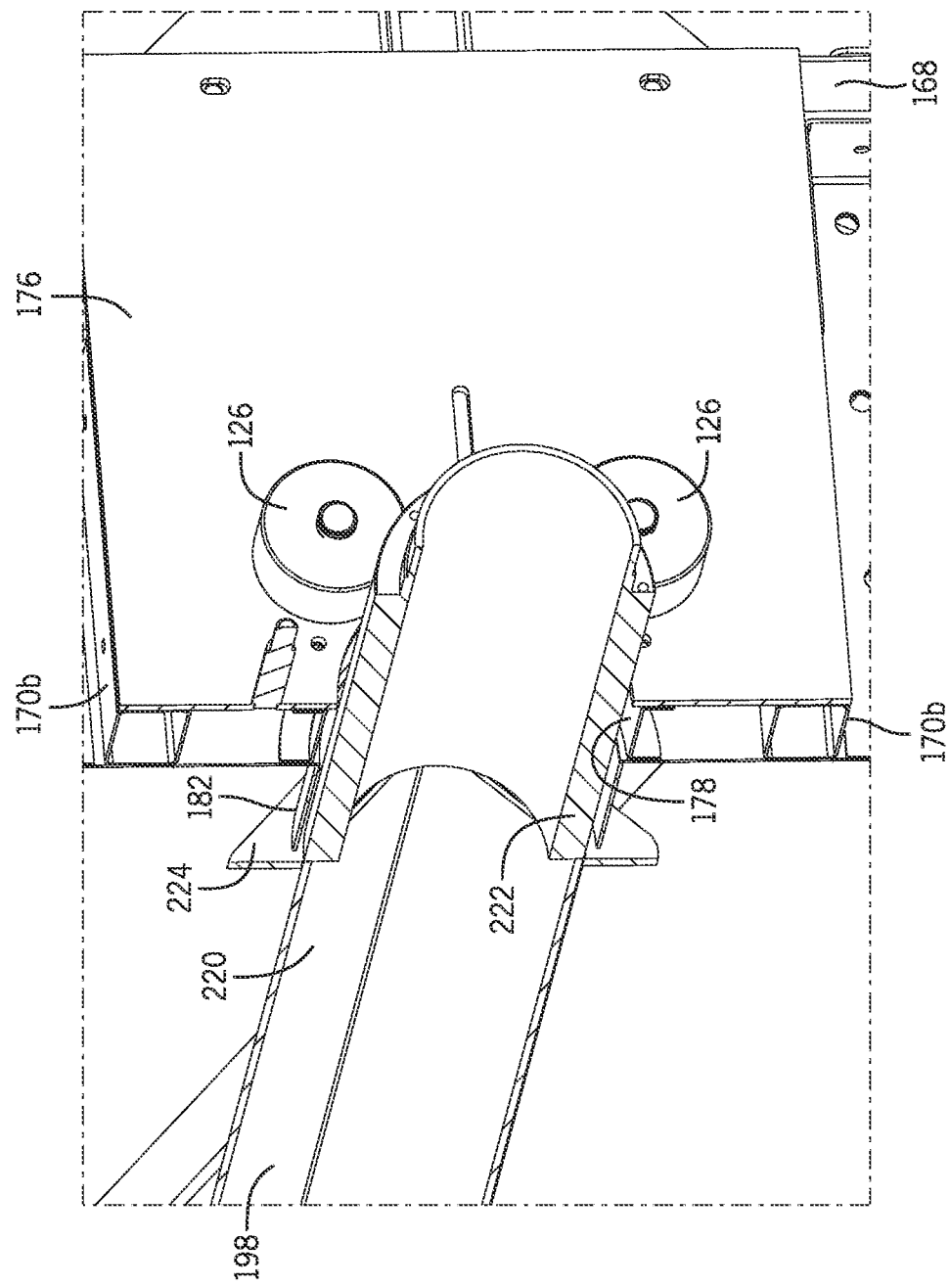
FIG. 12 is a cross-sectional perspective view of the second end of the modular dust collection system of FIG. 8.

In the illustrated embodiments, and with reference to FIG. 11, the direct rotational drive 120 may be configured as a motor 212 with an integrated gearbox 214 that that receives the drive shaft 210, thereby directly connecting the motor 212 to the drive shaft 210. The fit of the connection between the integrated gearbox 214 and the drive shaft 210 may be sufficiently tight to restrict the entrance of dust or other particulate into the integrated gearbox 214 and motor. This may be useful, for example, in order to reduce wear on the direct rotational drive 120, thereby reducing maintenance requirements. In the illustrated embodiments, the motor 212 may be oriented so that the internal motor output shaft (not shown) is perpendicular to the drive shaft 210 and integrated gearbox 214 may be configured as a right-angle transmission configured to link rotation of the drive shaft 210 to rotation of the internal motor output shaft. The motor may be configured as a variable speed motor that can be controlled to selectively increase or decrease the rotational speed of the hollow shaft 198 and the filter cleaning assembly 190. This may be useful, for example, in order to change a cleaning speed of the filter cleaning assembly.

Some embodiments may include a different interface for connecting the drive shaft 210 of the filter cleaning assembly to the rotational drive 210. For example, a motor 212 may be oriented so that the motor output shaft is parallel to the drive shaft 210 and connected thereto by a linear gearbox, or the motor 212 may be configured to receive the drive shaft 210 and rotate it as if it were the motor output shaft. In some embodiments, the direct rotational drive 120 may include a shaft that extends through the motor mount plate and the end plates to engage an opening on the hollow shaft or any other part of the filter cleaning assembly. Additionally or alternatively, the direct rotational drive 120 may be mounted on at least one of an end plate, the mounting support frame, and any other portion of the first end support.

Referring to FIGS. 8 and 11, a second axial end 220 of the hollow shaft 198 may include an outlet conduit 222 secured to the hollow shaft by an outlet flange 224 and can extend away from the second axial end 2220 in the axial direction. When the filter cleaning assembly 190 is received on the support frame 102, the outlet conduit 222 may extend through the opening(s) in the end plates 156, 158 and the opening 178 in the roller mount plate 176 to be received and supported by the roller supports 126 (see also FIG. 2). The outlet conduit 222 may additionally extend through a bushing 182 that extends from the interior surface of the end plates 156, 158 (see also FIG. 5) towards the flange 224. This may be useful, for example, in order to restrict movement of dust or other particulate out of the inner filter space 110 through the opening 178. Some embodiments, however, may be configured without a bushing.

While the outlet conduit 222 is supported by the roller supports 126, the filter cleaning assembly may be free to rotate within the drum filter 108. At least one of the roller supports 126 may be coated in or formed from a material that is con figured to abut and/or engage the outlet conduit 222 without damaging the roller support 126 or the outlet conduit 222. The roller supports 126 may be positioned such that each roller support 126 is offset both vertically and horizontally from the center of the outlet conduit 222. In the illustrated embodiments, the roller supports 126 are each positioned at forty-five degrees above or below the horizontal relative to the axial center point of the outlet conduit 222. Thus, engagement between the roller supports and the outlet conduit 222 restricts vertical and/or horizontal movement of the outlet conduit 222. This may be useful, for example, in order to keep the hollow shaft 198 centered and stable within the drum filter 108.

Some embodiments may include a roller mount plate 176 with a different configuration of roller supports. For example, an outlet conduit 222 may be supported and held in place by more than four roller supports, or fewer than four roller supports. Additionally or alternatively, some embodiments can include at least one roller support that is arranged in a different location than the illustrated roller supports 126.

Extending through the end plates 156, 158 of the second end support 154, the outlet conduit 222 may provide an exit through which collected dust and particulate debris can be moved out of the dust collection system 100. As illustrated in FIG. 2, the end of the outlet conduit 222 may be connected to a duct 82 that is configured to transport the collected dust and other particulate matter to additional collection/filtration equipment. The collection/filtration equipment may be mounted on the support frame 102, or it may be freestanding or connected to another structure. In the illustrated embodiments, duct 82 is connected to a cyclone separator 80 configured to remove particulate matter from the air that exits the modular dust collection system 100 through the outlet conduit 222. Some embodiments, however, may be connected to another piece of collection/filtration equipment.

As previously mentioned, the components of the modular dust collection system 100 may be subdivided into modular sections 132 that may be prefabricated and transported as an assembled modular section 132. When fully assembled, the modular sections 132 may be arranged in an end-to-end fashion in the axial direction. When an individual modular section 132 has been assembled for transportation, the corresponding cleaner segment 192 may not be included in its operational state. Some embodiments of a modular dust collection system 100 may be completely assembled and shipped as a completed unit.

In the illustrated embodiments, the modular dust collection system 100 may include three modular sections 132 that each include a frame segment 136 of the support frame 102, a filter segments 112 of the drum filter 108, and a cleaner segment 192 of the filter cleaning assembly 190. A first end modular section 132a is positioned at the first end 104 of the dust collection system 100 and includes the first end frame segment 136a, the filter segment 112 supported on the first end frame segment 136a, and a first cleaner segment 192a that the drive shaft mounting feature 206 is secured to. A second end modular section 132a is positioned at the second end 106 of the dust collection system 100 and includes the second end frame segment 136b, the filter segment 112 supported on the second end frame segment 136b, and a second cleaner segment 192b that the outlet conduit is coupled to. An interior modular section 132c is positioned between the first end modular section 13ba and the second end modular section 132b and includes the interior frame segment 136c, the filter segment 112 supported on the interior frame segment 136c, and an inner cleaner segment 192c that is coupled to the first and second cleaner segments 192a, 192b, thereby forming the hollow shaft 198.

Figure 13:
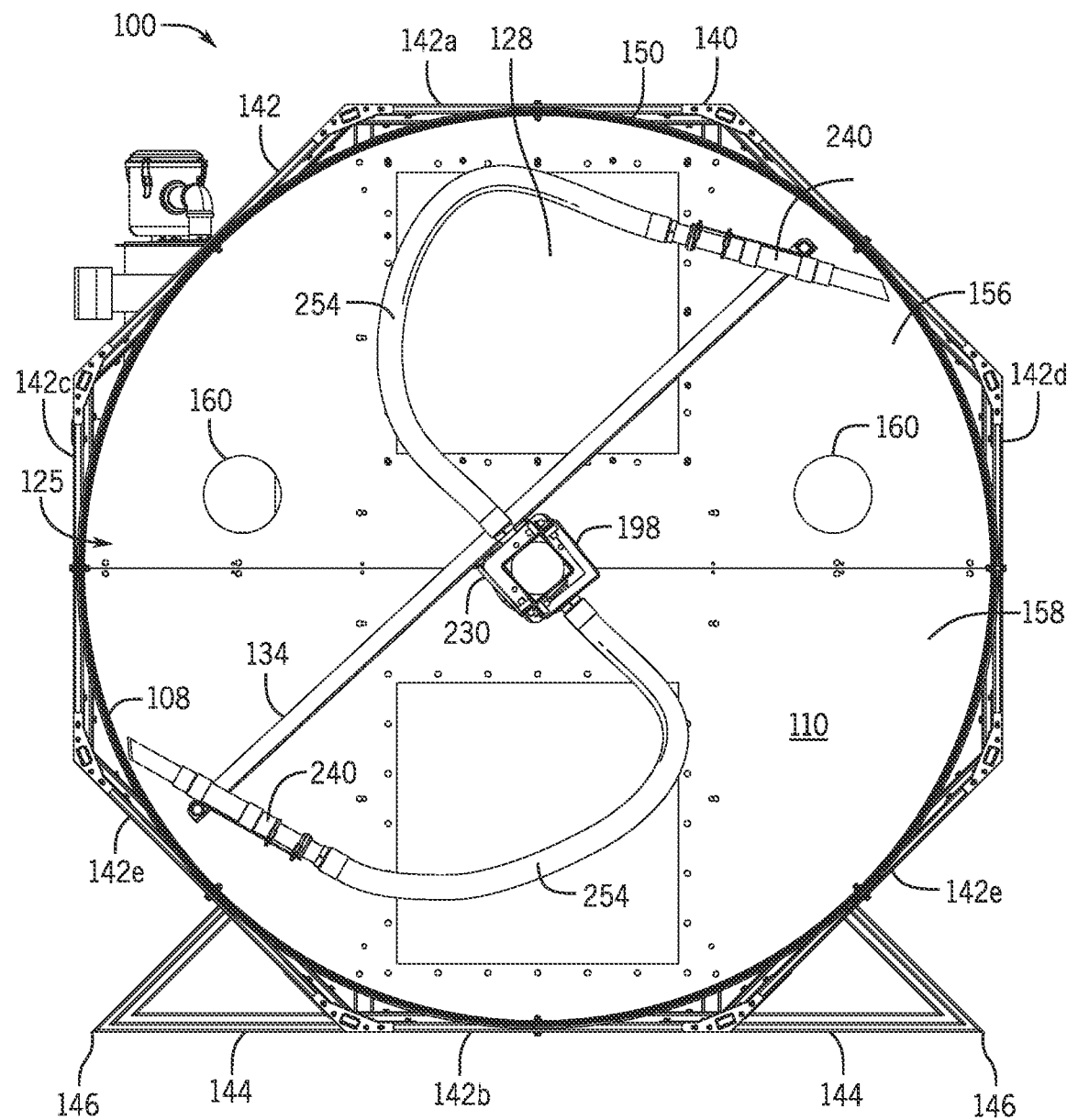
FIG. 13 is a front cross-sectional view of the modular dust collection system of FIG. 12.
Figure 14:
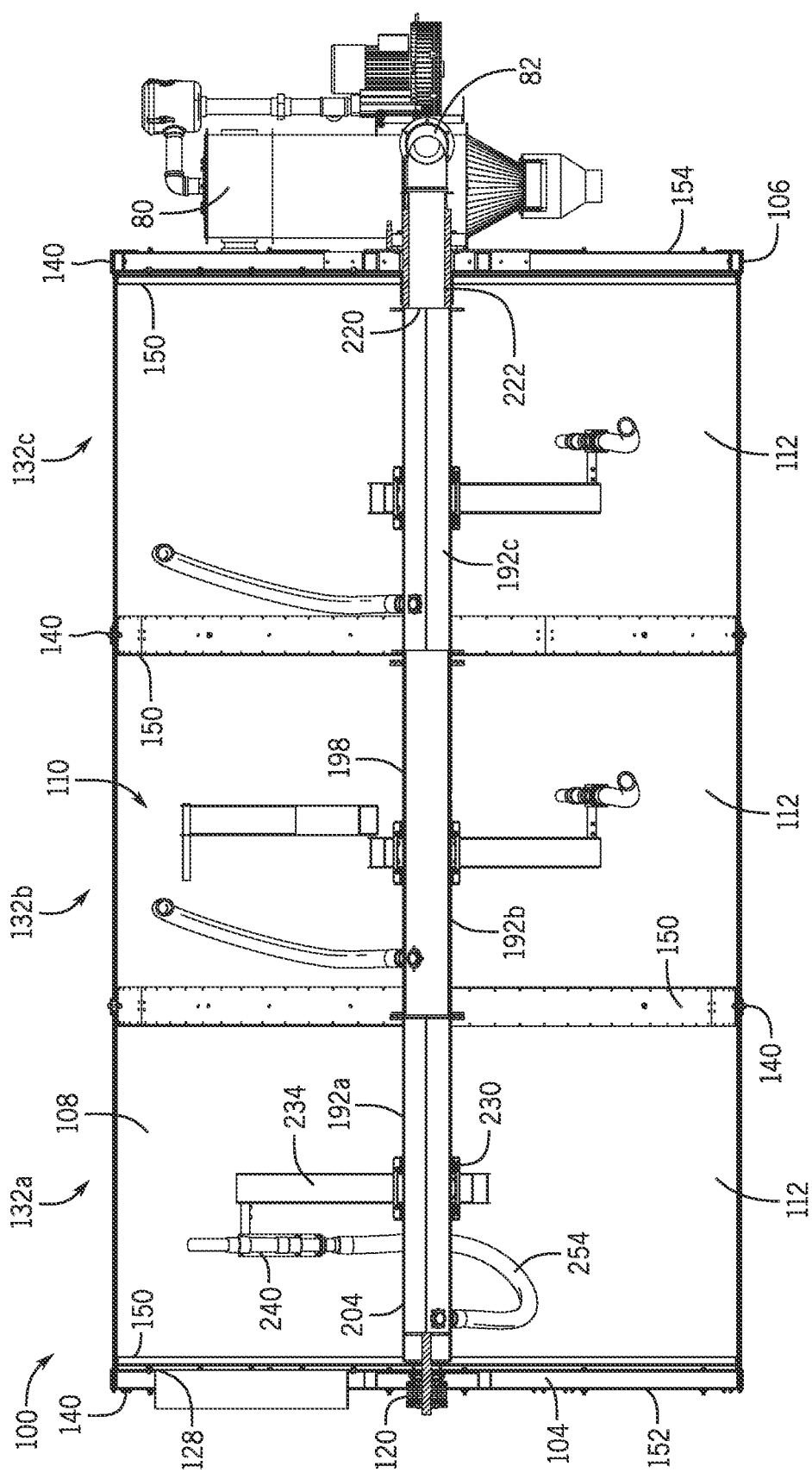
FIG. 14 is a side cross-sectional view of the modular dust collection system of FIG. 13.

Once the modular dust collection system 100 has been fully assembled, as illustrated in FIGS. 13 and 14, it may be operated to filter and collect dust and other particulate matter from the air. Dust-laden air is first forced into the inner filer space 110 through at least one of the inlet openings 128. The illustrated dust collection system 100 includes four inlet openings, which may the system 100 to receive air from four separate locations or air handling systems. Additionally or alternatively, multiple inlet openings 128 may be used to intake a larger volume of air from a single location. As air is continually blown and/or drawn into the inner filter pace 110, the air pressure increase forces the dust-laden air out of the inner filter space through the drum filter 108. As the air passes through the filter media, any dust or other particulate is deposited on the inner surface of the drum filter 108.

As dust accumulates on the drum filter media 108, the direct rotational drive 120 is controlled to rotate the filter cleaning assembly 190 within the inner filter space 110. As the filter cleaning assembly 190 rotates, the suction nozzles 240 travel around the inner filter space 110 skimming the inner surface of the drum filter media 108. The suction nozzles 240, which are mounted on the hollow shaft 198 by rolling carriages 230, can additionally be made to travel in a forward or reverse axial direction by at least one linear actuator (not shown). For example, an actuator configured as a cross-threaded screw drive can be controlled to make the connected carriage(s) 230 reciprocate along the hollow shaft 198. This may be useful, for example, so that the suction nozzles 240 may clean the entire inner surface of the drum filter.

As the suction nozzles 240 are moved along the interior surface of the drum filter media 108, dust deposited on the inner surface is sucked off the drum filter media 108 by the suction nozzles 240. The suction force, which may be generated by the cyclone separator 80, draws the dust into the suction nozzles 240, through the connecting hoses 254, into the hollow shaft 198, and out of the inner filter space 110 through the outlet conduit 222. The dust may then be transported through a duct connected to the outlet conduit 222 to the cyclone separator 80 or another system for further processing.

Some embodiments of a modular dust collection system may include arrangement of modular sections than the illustrated modular dust collection system. For example, a modular dust collection system may at least one additional interior modular section that is positioned between the first end modular section and the second end modular section. Other embodiments may omit at least one of the illustrated modular sections. For example, a modular dust collection system may only include a first end modular section that is directly connected to the second end modular section. Further still, a dust collection system may include just one modular section that extends between a first end octagonal support and a second end octagonal support.

It is to be appreciated that features depicted in conjunction with any one of the illustrated embodiments may be used in conjunction with the features of any other embodiment of the invention. In the above description, certain terms have been used for brevity, clarity, and understanding. No unnecessary limitations are to be inferred therefrom beyond the requirement of the prior art because such terms are used for descriptive purposes and are intended to be broadly construed. The different systems described herein may be used alone or in combination with other systems. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A support frame for dust collection system including a drum filter and a filter cleaning system, the support frame comprising:
   a plurality of octagonal supports spaced apart from each other in an axial direction, each octagonal support including a plurality of frame members that defining an octagon-shaped peripheral profile and outlining an octagon-shaped opening;
   a plurality of axial members, each axial member extending between adjacent octagonal supports of the plurality of octagonal supports;
   wherein one of the plurality of octagonal supports is configured as a first end support positioned at a first end of the support frame and a different one of the plurality of octagonal supports is configured as a second end support positioned at a second end of the support frame; and
   wherein the first end support and the second end support each include an end cover secured to the frame members of the first end support and the second end support and covering the octagon-shaped opening between the frame members, each cover including a first inlet opening and a second inlet opening.

2. The support frame of claim 1, wherein each end cover includes a first end plate covering an upper half of the octagon-shaped opening and a second end plate covering a lower half of the octagon-shaped opening; and
   wherein the first inlet openings are formed in the first end plates and the second inlet openings are formed in the second end plates.

3. The support frame of claim 1, further comprising an inlet cover configured to be removably secured to at least one of the cover plates to seal one of the first inlet openings or one of the second inlet openings.

4. The support frame of claim 1, wherein the first end support and the second end support each include a mounting support structure that extends between the frame members of the first end support and the second end support, the mounting support structure configured to rotatably support a hollow shaft of the filter cleaning system, the hollow shaft extending from the first end to the second end.

5. The support frame of claim 4, wherein the mounting support structure of the first end support includes a motor mount plate supporting a direct rotational drive configured to rotate the filter cleaning system; and
   wherein the motor mount plate includes an opening configured to receive a drive shaft that extends from the hollow shaft to engage the direct rotational drive.

6. The support frame of claim 4, wherein the mounting support structure of the second end support includes a roller mount plate and a plurality of rollers arranged around a conduit opening in the roller mount plate; and
   wherein the plurality of rollers are configured to receive an outlet conduit that extends from the hollow shaft to the plurality of rollers through the conduit opening.

7. The support frame of claim 6, wherein the plurality of rollers includes four rollers evenly spaced around the conduit opening, the four rollers being configured to restrict horizontal and vertical movement of the outlet conduit and the hollow shaft.

8. The support frame of claim 1, wherein the support frame is divided into a plurality of frame segments arranged in an end-to-end fashion along the axial direction, each frame segment including two adjacent octagonal supports of the plurality of octagonal supports and a set of axial members of the plurality of axial members that extend between the two adjacent octagonal supports;

wherein the plurality of frame segments includes a first end frame segment including the first end support and a second octagonal support of the first end frame segment adjacent the first end support; and wherein the plurality of frame segments includes a second end frame segment including the second end support and a second octagonal support of the second end frame segment adjacent the second end support.

9. The support frame of claim 8, wherein the plurality of frame segments are interconnected such that each frame segment shares at least one octagonal support with an adjacent frame segment; and wherein the plurality of frame segments includes an interior frame segment positioned between the first end segment and the second end segment, the interior frame segment including the second octagonal support of the first end frame segment and the second octagonal support of the second end frame segment.

10. The support frame of claim 1, wherein each of the octagonal supports includes support legs extending outward from at least one of the frame members in a lateral direction; and wherein a distal end of each leg is positioned within a footprint of the support frame.

11. The support frame of claim 1, wherein the plurality of axial members extend between corners of the adjacent octagonal supports.

12. A dust collection system comprising:

a plurality of modular sections arranged in an end-to-end fashion in an axial direction from a first end to a second end, each of the modular sections including:

a frame segment of a support frame, the frame segment including two adjacent octagonal supports spaced apart from each other in the axial direction and a plurality of axial members extending between the adjacent octagonal supports;

a filter segment of a drum filter, the filter segment being secured to the frame segment and extending in the axial direction from the two adjacent octagonal supports;

a cleaner segment of a filter cleaning assembly positioned within the filter segment, the cleaner segment including a shaft segment extending along the axial direction and a plurality of suction nozzles connected to the shaft segment and configured to clean the filter segment;

wherein the plurality of modular sections includes a first end modular section that extends from a first end octagonal support at the first end to a first interior octagonal support and a second end modular section that extends from a second end octagonal support at the second end to a second interior octagonal support.

13. The dust collection system of claim 12, wherein the plurality of modular sections are interconnected such that at least one of the two adjacent octagonal supports of each modular segment is a shared octagonal support that is also part of an adjacent one of the modular segments.

14. The dust collection system of claim 13, wherein the plurality of modular sections include an interior modular section that shares the first interior octagonal support with the first end modular section and the second interior octagonal support with the second end modular section.

15. The dust collection system of claim 12, wherein the drum filter defines a cylindrical interior filter space that extends along the axial direction from the first end octagonal support to the second end octagonal support; and wherein the interior filter space is enclosed by a first cover plate secured to the first end octagonal support and a second cover plate secured to the second end octagonal support, at least one of the first cover plate and the second cover plate including an inlet opening into the interior filter space.

16. The dust collection system of claim 15 wherein the shaft segments from the cleaner segment in each of the plurality of modular sections are coupled together in an end-to-end fashion to form a hollow shaft of the filter cleaning assembly; and wherein the first cover plate and the second cover plate each include a first inlet opening positioned above the hollow shaft and a second inlet opening positioned below the hollow shaft.

17. The dust collection system of claim 11, wherein the shaft segments from the cleaner segment in each of the plurality of modular sections are coupled together in an end-to-end fashion to form a hollow shaft of the filter cleaning assembly; and wherein the hollow shaft is rotatably supported on at least one of the first end octagonal support and the second end octagonal support.

18. The dust collection system of claim 17, further comprising a motor in direct operative engagement with a drive shaft extending from the hollow shaft, the motor being configured to rotate the hollow shaft thereby rotating the filter cleaning assembly.

19. The dust collection system of claim 18, wherein each of the suction nozzles is secured to a distal end of an arm that extends radially outward from each of the shaft segments, the suction nozzles being positioned so that a nozzle tip of each suction nozzle is in contact with an inner surface of the drum filter or positioned proximate the inner surface; and wherein rotation of the filter cleaning assembly causes the plurality of suction nozzles to travel circumferentially around the inner surface of the drum filter.

20. The dust collection system of claim 19, wherein each of the suction nozzles includes a flexible section configured to deflect the nozzle tip without damaging the suction nozzle.

* * * * *